United States Patent
Sanio et al.

(10) Patent No.: US 11,023,522 B2
(45) Date of Patent: *Jun. 1, 2021

(54) CREATING A SINGLE PLAYLIST WITH MULTIPLE AUTHORS

(71) Applicant: Google LLC, Mountain View, CA (US)

(72) Inventors: Jason Robert Richard Sanio, Mountain View, CA (US); Courtney Hampson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 16/173,451

(22) Filed: Oct. 29, 2018

(65) Prior Publication Data

US 2019/0065591 A1 Feb. 28, 2019

Related U.S. Application Data

(63) Continuation of application No. 14/160,679, filed on Jan. 22, 2014, now Pat. No. 10,114,892.

(51) Int. Cl.
*G06F 16/438* (2019.01)
*G06F 16/638* (2019.01)
*G06F 21/62* (2013.01)

(52) U.S. Cl.
CPC ........ *G06F 16/639* (2019.01); *G06F 16/4387* (2019.01); *G06F 21/6209* (2013.01)

(58) Field of Classification Search
CPC . G06F 16/639; G06F 16/4387; G06F 21/6209
See application file for complete search history.

(56) References Cited

U.S. PATENT DOCUMENTS

| | | |
|---|---|---|
| 7,363,372 B2 | 4/2008 | Potenzone et al. |
| 7,693,535 B2 | 4/2010 | Dunko |
| 8,346,798 B2 | 1/2013 | Spiegelman et al. |
| 8,688,991 B1 | 4/2014 | Sunil |
| 2006/0195521 A1 | 8/2006 | New et al. |
| 2007/0118801 A1 | 5/2007 | Harshbarger et al. |
| 2008/0178239 A1 | 7/2008 | Yampanis |

(Continued)

OTHER PUBLICATIONS

Miller, Michael, "Collaborating on Group Playlists with Spotify", http://ww.quenpublishing.com/articles/printerfriendly/1847303 [retrieved on Aug. 11, 2017), Mar. 5, 2012, 3 pages.

(Continued)

*Primary Examiner* — Jorge A Casanova
(74) *Attorney, Agent, or Firm* — Lowenstein Sandler LLP

(57) ABSTRACT

A method for creating a single playlist with multiple authors is disclosed. The method includes storing a uniform resource locator (URL) of a playlist and a first identifier (ID) of a first user that is an author of the playlist as metadata of the playlist, receiving an invite indication that a second user is to be invited as another author of the playlist, providing sharing options for inviting the second user to be the another author, receiving a sharing indication of a selected sharing option of the sharing options, providing, based on the selected sharing option, an invitation to the second user, the invitation to request the second user to be an author of the playlist and to provide access to the playlist via the URL, and storing a second ID of the second user and permissions corresponding to the second user as the metadata of the playlist.

20 Claims, 11 Drawing Sheets

(56) References Cited

U.S. PATENT DOCUMENTS

| | | |
|---|---|---|
| 2008/0229215 A1 | 9/2008 | Baron et al. |
| 2010/0017714 A1 | 1/2010 | Agarwal et al. |
| 2010/0030744 A1 | 2/2010 | DeShan et al. |
| 2010/0110200 A1 | 5/2010 | Lau et al. |
| 2010/0194703 A1 | 8/2010 | Fedor et al. |
| 2011/0219461 A1 | 9/2011 | Baird-Smith et al. |
| 2011/0314388 A1 | 12/2011 | Wheatley |
| 2012/0102573 A1 | 4/2012 | Spooner et al. |
| 2013/0218942 A1 | 8/2013 | Willis et al. |
| 2014/0223099 A1 | 8/2014 | Kidron |
| 2015/0205971 A1 | 7/2015 | Sanio et al. |

OTHER PUBLICATIONS

European Patent Office, EP Search Report for Application No. 15741098.6, dated Aug. 21, 2017, 9 pages.

Von Wiegandt, "Spotify: Incentivizing Album Creation Through "The Facebook" of Music," Berkeley Journal of Entertainment and Sports Law. Retrieved on [Mar. 12, 2015]. Retrieved from the internet: <URL: http://scholarship.law.berkeley.edu/cgi/viewcontent.cgi?article=1032&context=bjesl&sei-redir=1&referer=https%3A%2F%2Fscholar.google.com%2Fscholar%3Fq%3Dcollaborative%2Bplaylist%2Bspotify%26btnG%3D%26hi%3Den%26as_sdt%3D1%252C47#search=%22collaborative%20playlists%20spotify%22>, 21 pages.

International Search Report for and The Written Opinion for the International Searching Authority for International Patent Application No. PCT/US2015/012492, dated Apr. 30, 2015, 15 pages.

Derral Eves, "How To Add Multiple Users To Manage Your Youtube Channel," http://www.youtube.com/watch?v=dNRpkj7bEal; Aug. 13, 2013; [retrieved on Feb. 3, 2014]; 3 pages.

Andre Arko, myPiex, "Email videos to your myPiex Queue," http:f/elan.plexapp.com/2011/11/20/email-videos-to-your-myplex-queue/; Nov. 20, 2011; [retrieved on Feb. 3, 2014]; 6 pages.

Youtube, Google, Inc., "You Tube Direct," https://developers.google.com/youtube/ytdirect?csw=1; Apr. 1, 2012; [retrieved on Feb. 3, 2014]; 2 pages.

Google Product Forums, pseudonymous users of Google Product Forums, "Can I allow users to upload videos on my youtube channel?", https://productforums.google.com/forum/#!topic/youtube/NugXsNtTJZU; Aug. 16, 2013; [retrieved on Feb. 3, 2014]; 4 pages.

USPTO, Office Action for U.S. Appl. No. 14/160,679, dated May 6, 2016.

USPTO, Final Office Action for U.S. Appl. No. 14/160,679, dated Sep. 14, 2016.

USPTO, Office Action for U.S. Appl. No. 14/160,679, dated Nov. 21, 2016.

USPTO, Office Action for U.S. Appl. No. 14/160,679, dated Apr. 12, 2017.

USPTO, Final Office Action for U.S. Appl. No. 14/160,679, dated Sep. 22, 2017.

USPTO, Office Action for U.S. Appl. No. 14/160,679, dated Mar. 29, 2018.

USPTO, Advisory Action for U.S. Appl. No. 14/160,679, dated Nov. 16, 2017.

USPTO, Notice of Allowance for U.S. Appl. No. 14/160,679, dated Jun. 29, 2018.

400

```
┌─────────────────────────────────────────────────────────────────┐
│ Receive, from a user, a request to interact with playlist as an │
│ author of the playlist, wherein playlist is hosted by a content │
│ sharing platform and has multiple authors                       │
│                                                             410 │
└─────────────────────────────────────────────────────────────────┘
                                 │
                                 ▼
┌─────────────────────────────────────────────────────────────────┐
│ Determine user ID of the requesting user                        │
│                                                             420 │
└─────────────────────────────────────────────────────────────────┘
                                 │
                                 ▼
┌─────────────────────────────────────────────────────────────────┐
│ Reference playlist metadata with user ID                        │
│                                                             430 │
└─────────────────────────────────────────────────────────────────┘
                                 │
                                 ▼
                       ╱ User indicated ╲       NO      ┌──────────────┐
                      ╱ as playlist author? ╲──────────▶│ Deny request │
                      ╲       440          ╱            │          450 │
                       ╲                  ╱             └──────────────┘
                                 │ YES
                                 ▼
┌─────────────────────────────────────────────────────────────────┐
│ Determine permissions configured for the user with respect to   │
│ the playlist                                                    │
│                                                             460 │
└─────────────────────────────────────────────────────────────────┘
                                 │
                                 ▼
┌─────────────────────────────────────────────────────────────────┐
│ Correlate determined permissions with content sharing platform  │
│ user data associated with the user                              │
│                                                             470 │
└─────────────────────────────────────────────────────────────────┘
                                 │
                                 ▼
┌─────────────────────────────────────────────────────────────────┐
│ Enforce permissions on user with respect to the playlist based  │
│ on the correlating, the enforcing simultaneous with             │
│ interactions from other authors of the playlist                 │
│                                                             480 │
└─────────────────────────────────────────────────────────────────┘
```

CREATING A SINGLE PLAYLIST WITH MULTIPLE AUTHORS

RELATED APPLICATIONS

This application is a continuation of U.S. patent application Ser. No. 14/160,679, filed Jan. 22, 2014, which is hereby incorporated by reference in its entirety.

TECHNICAL FIELD

This disclosure relates to the field of content sharing platforms and, in particular, to creating a single playlist with multiple authors.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

Content sharing platforms allow users to create playlists of the content maintained by the content sharing platform. A playlist of is a list of content items that may be played sequentially or in shuffled order. The playlist feature of the content sharing platform allows users to group their favorite content items together in a single location for playback. Currently, only one user is able to author a playlist (e.g., adding or removing content items from the playlist), which means playlist authoring is a solitary and unsocial task, and can, in some cases, discourage product usage of the content sharing platforms.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for creating a single playlist with multiple authors is disclosed. The method includes receiving, by a content sharing platform from a first user that is an author of a playlist of the content sharing platform, an indication of a second user to invite as another author of the playlist, the indication comprising an identifier of the second user and permissions corresponding to the second user. The method further includes sending an invitation to the second user requesting the second user to be an author of the playlist. The method further includes, when the second user accepts the invitation, storing the identifier of the second user and the permissions as metadata of the playlist, the second user to be allowed to interact with the playlist in accordance with the permissions corresponding to the second user.

In one implementation, the method also includes the playlist including one or more content items of the content sharing platform grouped together for continuous playback. In some implementations, the first user is an owner of the playlist. The owner may be the only author of the playlist with revocation privileges with respect to the playlist. In addition, the permissions may be selected by the first user and defining editing rights of the playlist assigned to the second user. Furthermore, the permissions may include at least one of adding content items to the playlist, deleting content items from the playlist, editing a title of the playlist, editing a description of the playlist, editing an order of the playlist, inviting user to view the playlist, or inviting users as authors of the playlist.

In some implementations, the first user and the second user may be authors of the playlist simultaneously. Furthermore, the permissions may include a type of content item that the second user may add to the playlist. In one implementation, the second user includes a plurality of users of the content sharing platform.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

FIG. 4 is a flow diagram illustrating another method for interacting with a single playlist by multiple authors, according to an implementation of the disclosure.

FIGS. 6A through 6D illustrate example screenshot of a playlist sharing settings UI provided to a user editing a playlist of a content sharing platform via a media player at a client device, according to an implementation of the disclosure.

DETAILED DESCRIPTION

Implementations are described for creating a single playlist with multiple authors. In implementations of the disclosure, a content sharing platform shares editing rights to a playlist with multiple users of the content sharing platform. A playlist may include a list of content items of the content sharing platform that are grouped for sequential or shuffled playback. The multiple users may be referred to as "authors" of the playlist. The content sharing platform allows the multiple authors to edit the playlist at the same time. Each of the authors may be assigned various permission levels with respect to the playlist. For example, the permission levels may include, but are not limited to, ownership (full editing rights plus moderation rights), full editing rights (add content, remove content, invite users, etc.), edit playlist content and order, edit playlist order, watch and request, watch/view, and make requests.

Implementations of the disclosure have a different layer of granularity than previous solutions for creating a single playlist with multiple authors. Previously, only one user was able to author a playlist at a time. This resulted in playlist authoring being a solitary and unsocial task, and, in some cases, discouraged product usage of the content sharing platform. Implementations of the disclosure improve the playlist authoring experience. A playlist with multiple authors as provided by implementations of the disclosure creates a social way to create a playlist with connections of a user. Thus, it can increase the number of content items added to the playlist, and thus increase user time on the content sharing platform. In addition, by making playlists a more social experience on the content sharing platform, the playlist feature may be more desirable to users, thus driving an increase in usage of the content sharing platform.

Figure 1:
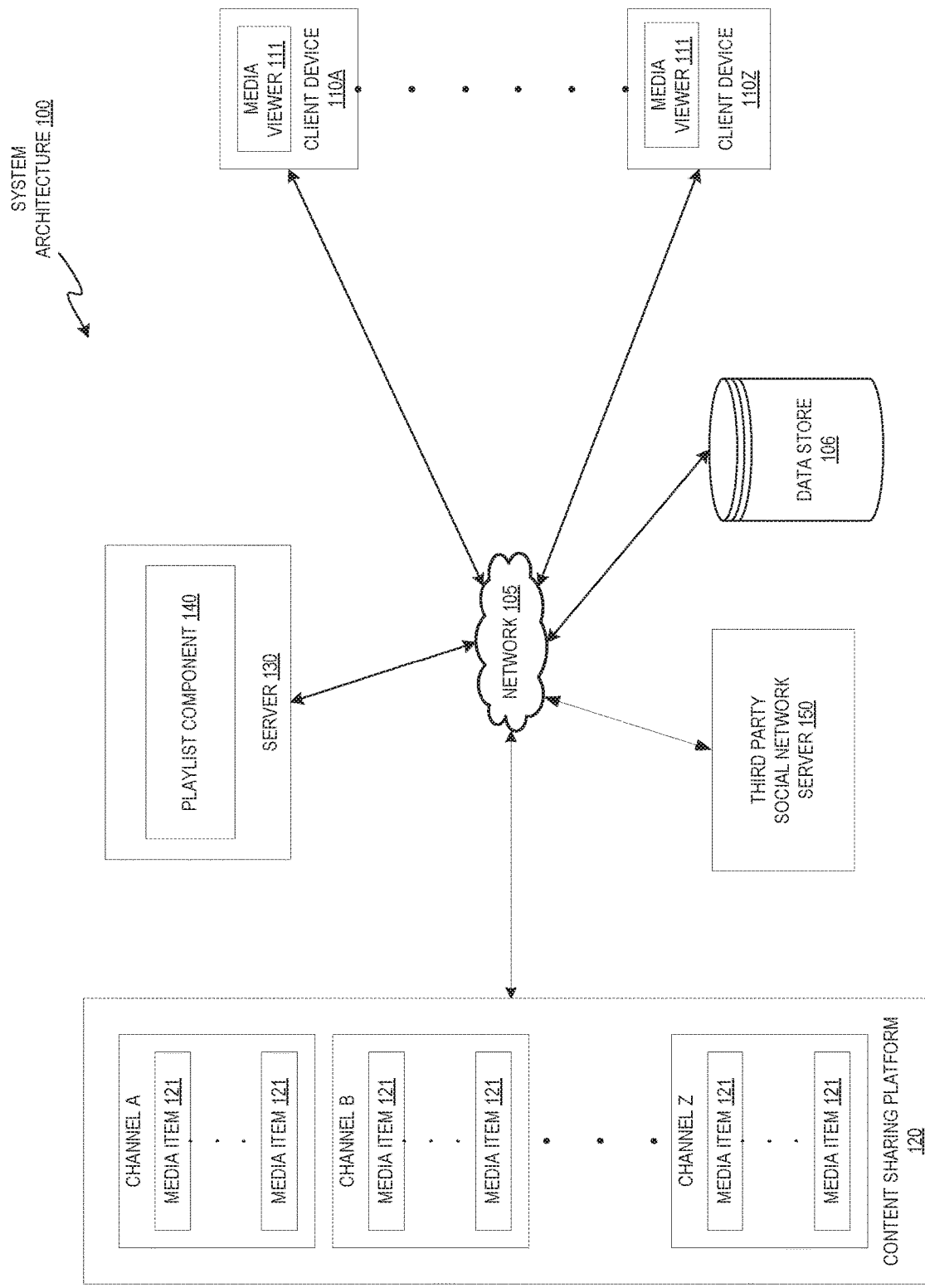
FIG. 1 illustrates an example system architecture, in accordance with one implementation of the disclosure.

FIG. 1 illustrates an example system architecture 100, in accordance with one implementation of the disclosure, for creating a single playlist with multiple authors for the content sharing platform. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a playlist component 140. The playlist component 140 enables sharing editing rights to a playlist with multiple users of the content sharing platform 120. A playlist may include a list of content items 121 of the content sharing platform 120 that are grouped for sequential or shuffled playback. These multiple users may be referred to as "authors". The playlist component 140 allows the multiple authors to edit the playlist at the same time. The playlist component 140 also allows for a playlist to be stored by the content sharing platform 120 so that it can be used for playback at a later time by any of the authors or other users of the content sharing platform 120.

More specifically, in implementations of the disclosure, the playlist component 140 may enable multiple users of the content sharing platform to be authors of a playlist. An owner (original creator) of the playlist may invite one or more other users to participate as authors of the playlist. Each of the one or more other users may be assigned various permission levels with respect to the playlist. For example, the permission levels may include, but are not limited to, ownership (full editing rights plus moderation rights), full editing rights (add content, remove content, invite users, etc.), edit playlist content and order, edit playlist order, request content items for the playlist, view content items of the playlist, and make requests to add content items to the playlist. In some implementations, playlist component 140 of server 130 may interact with content sharing platform and/or with other third party social network servers 150 to provide implementations of the disclosure. Further description of the playlist component 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
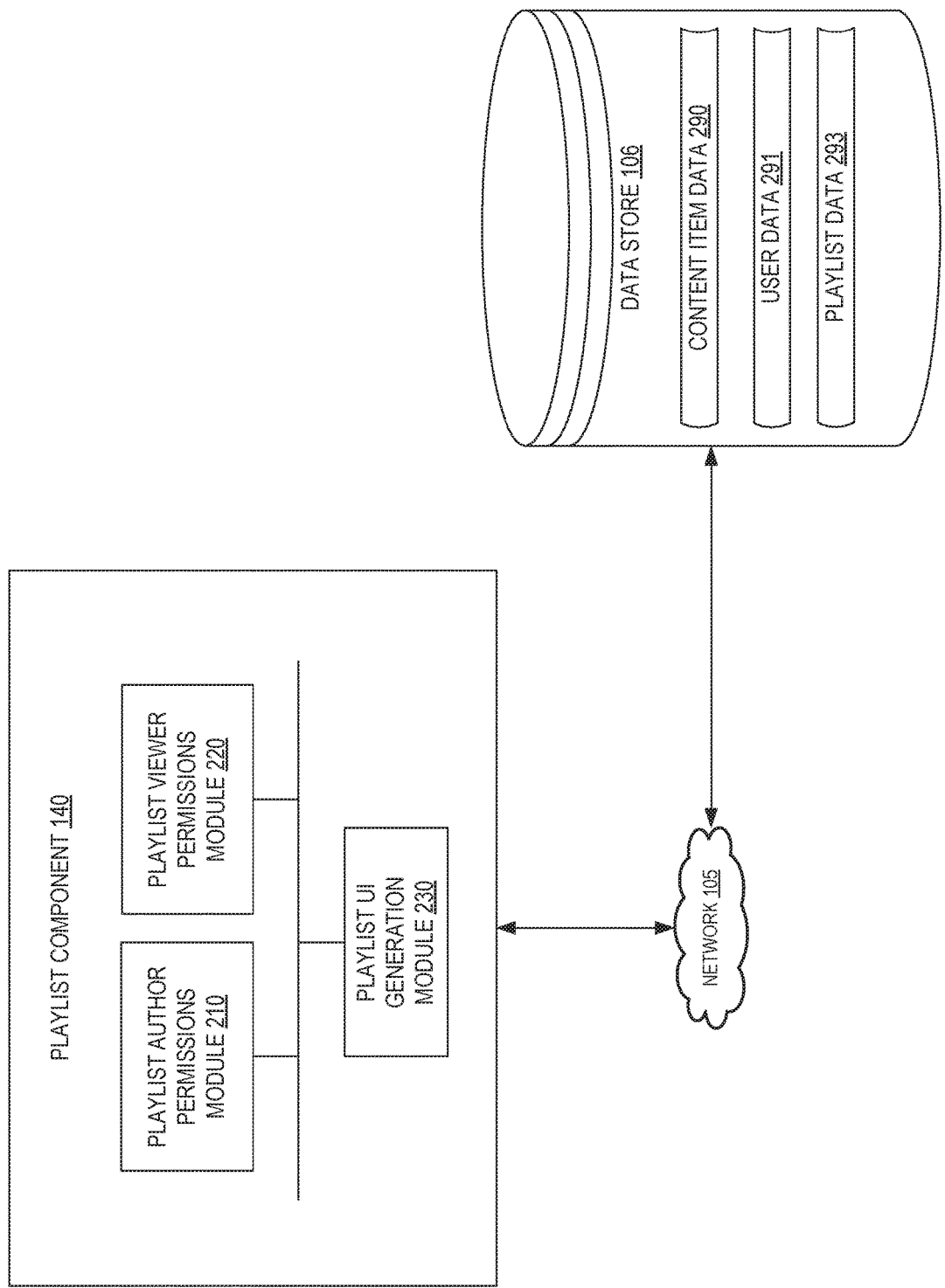
FIG. 2 is a block diagram illustrating a playlist component in accordance with one implementation of the disclosure.

FIG. 2 is a block diagram illustrating a playlist component 140 in accordance with one implementation of the disclosure. In one implementation, the playlist component 140 includes a playlist authors permissions module 210, a playlist viewers permissions module 220, and a playlist UI generation module 230. More or less components may be included in the playlist component 140 without loss of generality. For example, two of the modules may be combined into a single module, or one of the modules may be divided into two or more modules. In one implementation, one or more of the modules may reside on different computing devices (e.g., different server computers).

The playlist component 140 is communicatively coupled to the data store 106. For example, the playlist component 140 may be coupled to the data store 106 via a network (e.g., via network 105 as illustrated in FIG. 1). In another example, the playlist component 140 may be coupled directly to a server where the playlist component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, user data 291, and playlist data 292.

As discussed above, the playlist component 140 enables sharing editing rights to a playlist with multiple users of the content sharing platform 120. These multiple users may be referred to as "authors". The playlist component 140 allows multiple authors to edit a single playlist simultaneously. The playlist component 140 also allows for a playlist to be stored by the content sharing platform 120 so that it can be used for playback at a later time by any of the authors or by other content sharing platform users 120. In some implementations, an author of a playlist may invite multiple users associated with, for example, an email alias or a group of connections from a social network, to be authors or viewers of a playlist.

An owner (original creator) of the playlist may invite one or more other users to participate as authors of the playlist. The playlist author permissions module 210 may facilitate assigning playlist permissions levels to each of the invited authors of the playlist. For example, the permission levels may include, but are not limited to, ownership (full editing rights plus moderation rights), full editing rights (add content, remove content, reorder content, change playlist name, invite authors, invite viewers, etc.), edit playlist content and order, edit playlist order, watch and request, watch/view, and make requests. Moderation rights of the playlist owner may include an ability to revoke editing rights of other authors and/or an ability to classify the playlist as private (e.g., viewable by a predetermined set of users).

In implementations of the disclosure, the playlists author permissions module 210 tracks, stores, and implements the individualized permissions that are configured for each author of a playlist. For example, the playlist author permissions module 210 may store permission options selected to associate with an author to the playlist data 293. For example, a content sharing platform user ID of the author may be stored in the playlist data along with corresponding data indicating the permissions applicable to the author associated with the user ID. When the author interacts with the playlist, the playlist author permissions module 210 may reference the user data 291 and playlist data 293 to correlate permissions settings configured for the interacting user, and apply and/or enforce these permissions for purposes of the user's (i.e., author's) interactions with the playlist.

As such, each author of a playlist may have a different set of permissions associated with the playlist. In some implementations, the permissions for an author may also specify type of content that can be added to a playlist (e.g., no NC-17 content can be added or viewed by a user that is under 17). As a result, an owner, and in some cases depending on permission levels, authors of a playlist can control who views a playlist as well as who can add content and the type of content that can be added. For example, if an owner of a playlist is a teacher, the owner may add users that are students of the teacher as authors and limit the permissions of the student users to adding content that is from pre-approved channels of the content sharing platform or that is associated with a certain content rating. In some implementations, permissions may be automatically assigned to an added user and/or author based on relationship to and/or age of, for example, the inviting author and/or of the invited user.

In some implementations, the playlist author permissions module 210 may utilize information associated with the user data 291 in order to apply content type permissions to a user/author. For example, if the permissions indicate the individual author (or any author of the playlist according to a general playlist permissions setting) can only add content that is appropriate for his or her age, then the playlist author permissions module 210 can utilize user data 291 associated with the individual user to determine an age of the user for purpose of determining whether or not to allow the user to add particular content items to the playlist. Furthermore, the playlist author permissions module 210 may refer to the content item data 290 to determine the content type data for purposes of enforcing the author content type permissions.

In implementations of the disclosure, a user of the content sharing platform may be either or both of an author or a viewer of the playlist. Different permissions and privileges may be applied to viewers of the playlist as compared to authors of the playlist. Accordingly, the playlist viewer permission module 220 is responsible for maintaining, applying, and/or enforcing the permissions associated with each viewing user. As a result, the same playlist may include a different set of content items based on the viewing user (and his or her associated permissions).

As each of the multiple authors adds content items to a playlist, the playlist is dynamically updated so that each time a user requests to view or listen to the playlist, the playlist reflects the most recently-added content items. In one implementation, the playlist UI generation module 230 is responsible for generating the UI for the playlist and providing UI data to a client device for display of the playlist.

Figure 3:
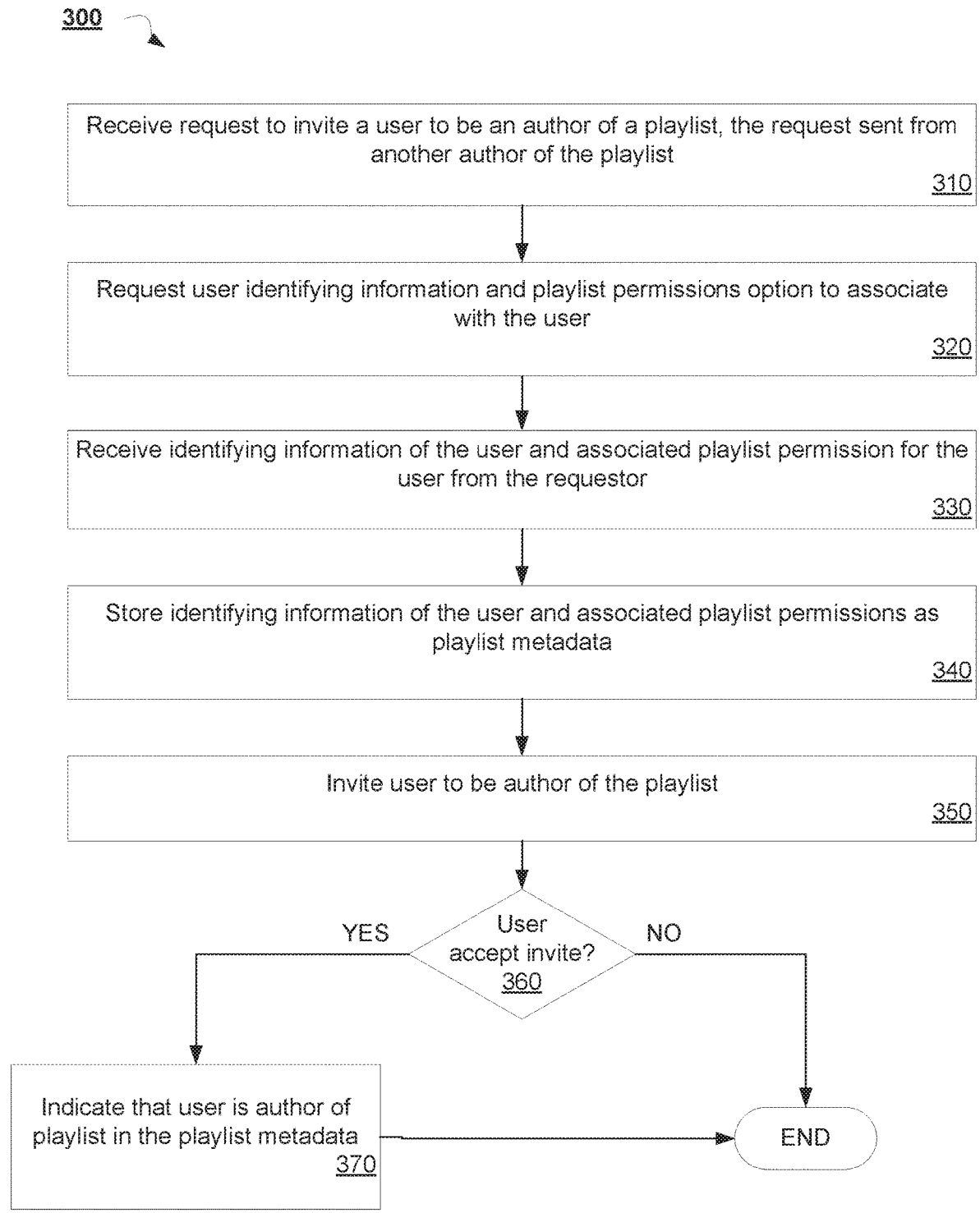
FIG. 3 is a flow diagram illustrating a method for creating a single playlist with multiple authors, according to some implementations of the disclosure.

FIG. 3 is a flow diagram illustrating a method 300 for creating a single playlist with multiple authors, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by playlist component 140 as shown in FIGS. 1 and 2.

Referring to FIG. 3, method 300 begins at block 310 when a request is received to invite a user of a content sharing platform to be an author of a playlist. In one implementation, the request is received from a user that is an author of the playlist. The requesting author may also be the owner of the playlist. The invited user may be a single user or may be multiple users associated with, for example, an email alias or a group of connections from a social network. In some implementations, the requesting user selects an icon to invite users to be authors of the playlist. The icon may be provided on a GUI associated with the playlist At block 320, the playlist component 140 requests identifying information of the invited user(s) as well as playlist permission options to associated with the invited user(s). The playlist permission options may include, but are not limited to, full editing rights (add content, remove content, reorder content, change playlist name, invite authors, invite viewers, etc.), edit playlist content and order, edit playlist order, watch and request, watch/view, and make requests. Permission options may also include content-type restrictions to associate with the user (e.g., types of the content that the user may add to the playlist and/or view from the playlist). Then, at block 330, the identifying information of the invited user(s) and associated playlist permission options are received from the requesting user.

At block 340, the received identifying information and associated playlist permission options are stored at the content sharing platform as playlist metadata associated with the playlist. Then, at block 350, the invited user(s) is notified and/or invited to be an author of the playlist with the indicated permission options. Subsequently, it is determined whether the invited user accepted the playlist author invite at decision block 360. If not, method 300 ends. On the other hand, if the invited user(s) does accept the playlist author invite, then method 300 continues to block 370 where the invited user(s) is indicated to be an author of the playlist in the playlist metadata.

FIG. 4 is a flow diagram illustrating another method 400 for interacting with a single playlist by multiple authors, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by playlist component 140 as shown in FIGS. 1 and 2.

Referring to FIG. 4, method 400 begins at block 410 when a request to interact with a playlist as an author of the playlist is received from a user. In one implementation, the playlist hosted by a content sharing platform and is assigned multiple authors that are users of the content sharing platform.

The request to interact with the playlist as an author may include a request to edit content of the playlist, add content to the playlist, remove content from the playlist, change an order of content of the playlist, change a name of the playlist, invite a user to view the playlist, invite a user to be an author of the playlist, and so on.

At block 420, a user ID of the requesting user is determined. Then, at block 430, playlist metadata corresponding to the playlist is referenced with the determined user ID. At decision block 440, it is determined whether the user identified by the user ID is indicated as a playlist author in the playlist metadata. If not, the method 400 proceeds to block 450 to deny the user request to interact with the playlist as an author.

On the other hand, if the user is confirmed to be an author of the playlist (e.g., playlist metadata indicates that user ID has authorship privilege with respect to the playlist), then method 400 proceeds to block 460 where permissions configured for the requesting user with respect to the playlist are determined. For example, the permissions may include, but are not limited to, full editing rights (add content, remove content, reorder content, change playlist name, invite authors, invite viewers, etc.), edit playlist content and order, edit playlist order, watch and request, watch/view, and make requests. Permission options may also include content-type restrictions to associate with the user (e.g., types of the content that the user may add to the playlist and/or view from the playlist).

At block 470, the determined permissions corresponding to the requesting user are correlated to data associated with the user (user data) and maintained by the content sharing platform separate from the playlist metadata. For example, the user data may indicate an age of the user. This age data is correlated with the content-type restrictions permissions associated with the user, in order to determine if a user is allowed to add and/or view certain types of content (e.g., NC-17 content, etc.) with respect to the playlist.

Lastly, at block 480, the permissions corresponding to the user are enforced with respect to the playlist for purposes of the user's request. The enforcement of the permissions is performed in view of the correlation at block 470. As such, it is determined whether the user's request corresponds to a permission level of the user. For example, if the user requests to invite a user as an author or as a viewer of the playlist, it is confirmed that the permission level of the user allows this action. In another example, as mentioned above, if the user requests to add NC-17 content to the playlist, it is determined whether the user has "add content" privileges with respect to the playlist and whether content-type restrictions apply to this user before the user is allowed to proceed with this action. In implementations of the disclosure, each author of the playlist may have different permissions levels, so that some authors may be able to perform different actions with respect to the playlist than other authors, or may be able to add and/or view different content with respect to the playlist than other authors.

Figure 5:
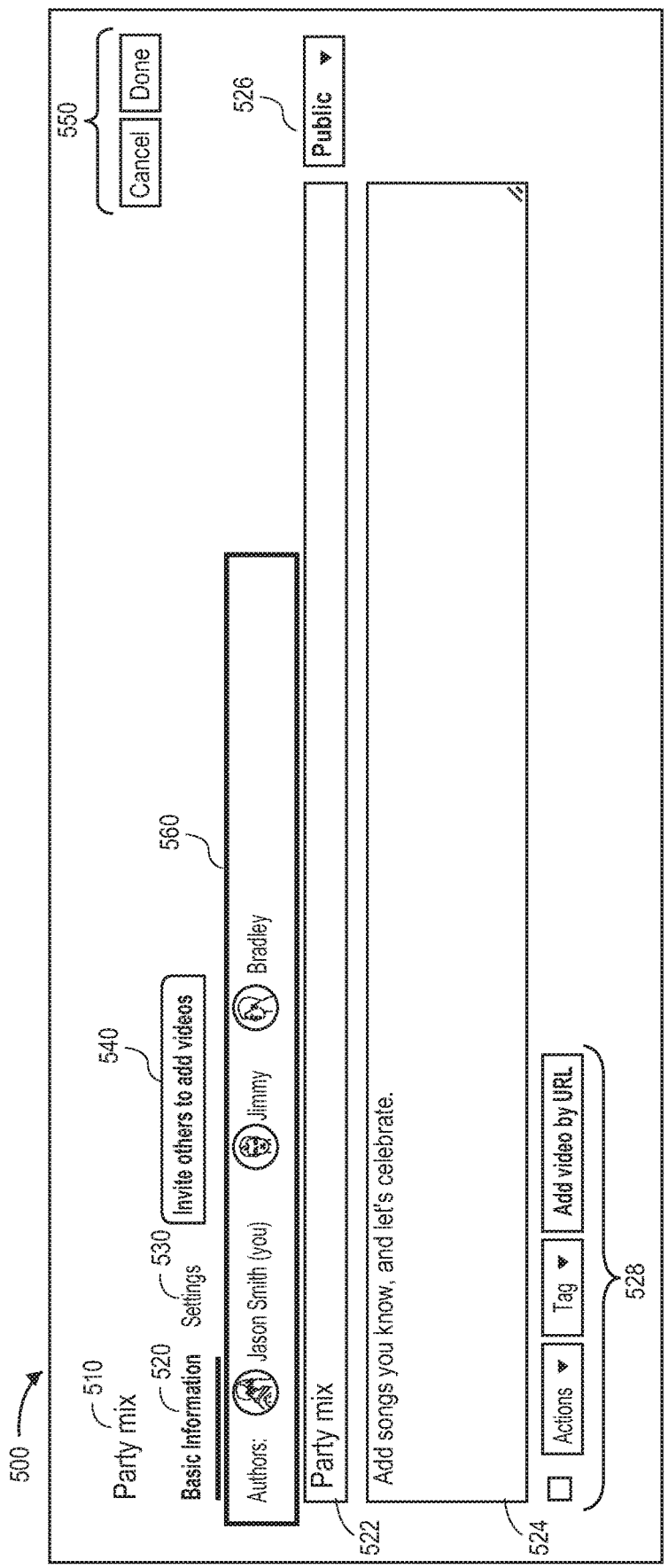
FIG. 5 is an example screenshot illustrating a playlist settings UI provided to a user via a media player at a client device, according to an implementation of the disclosure.
Figure 6A:
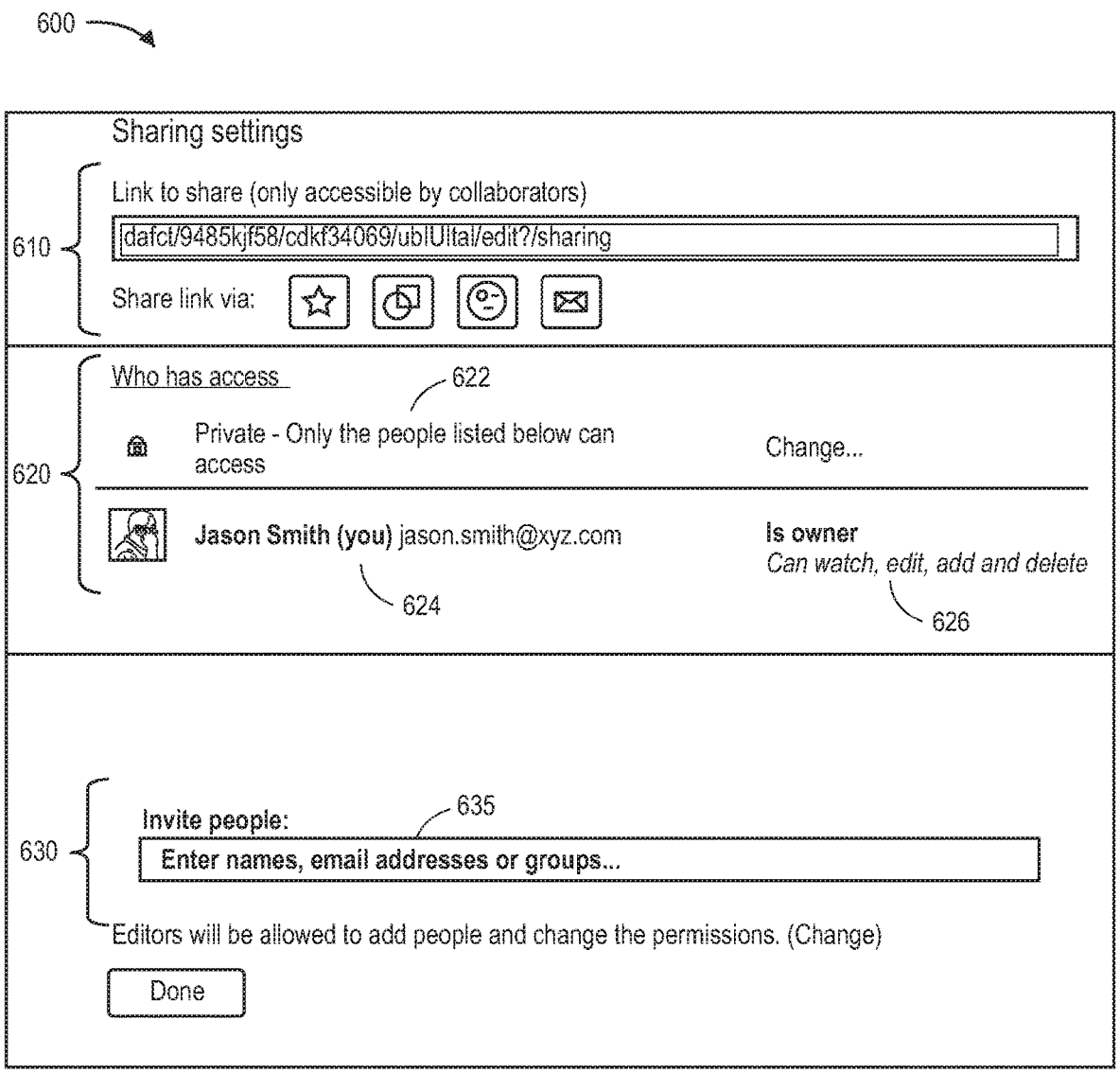
Figure 6B:
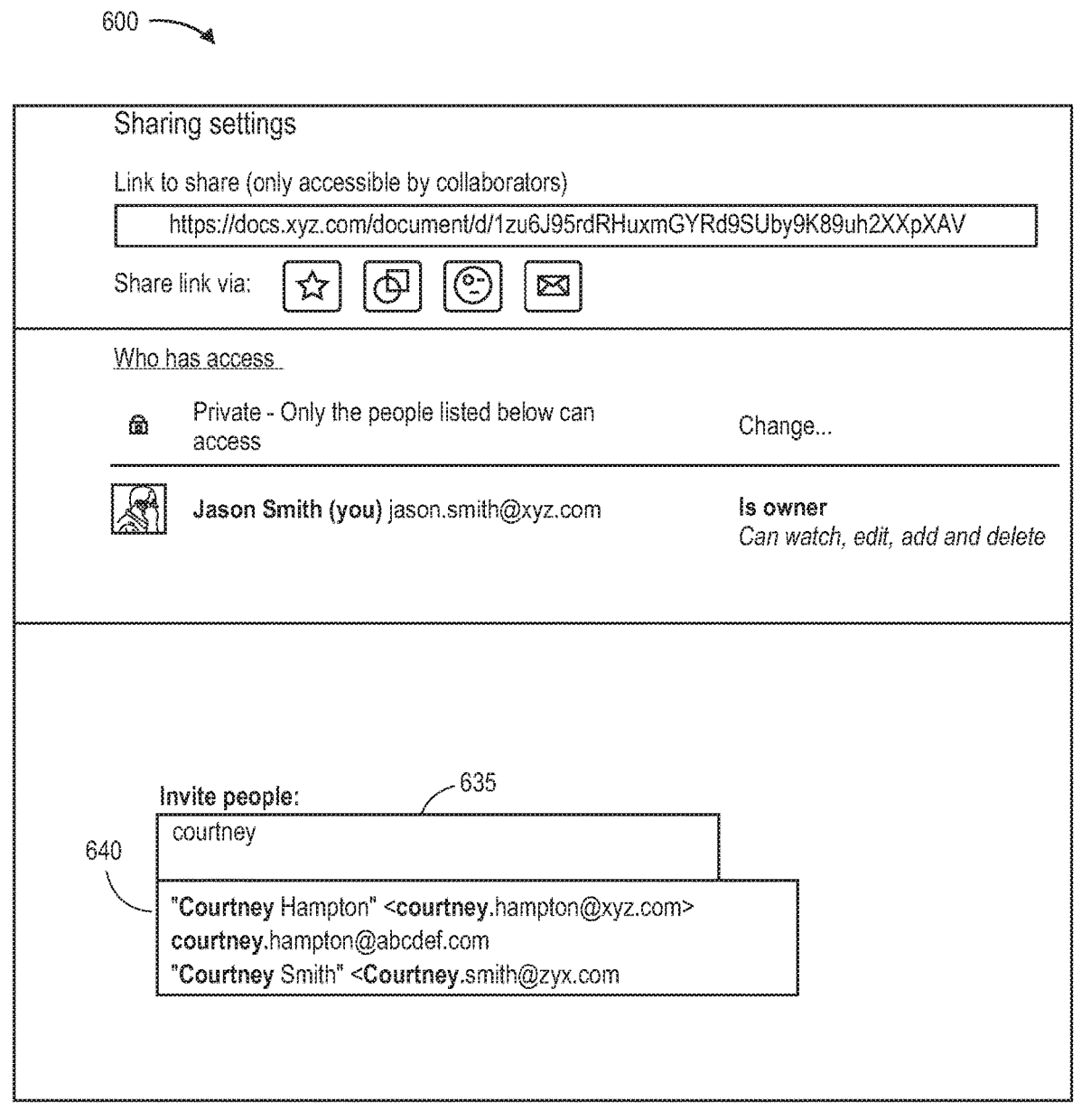
Figure 6C:
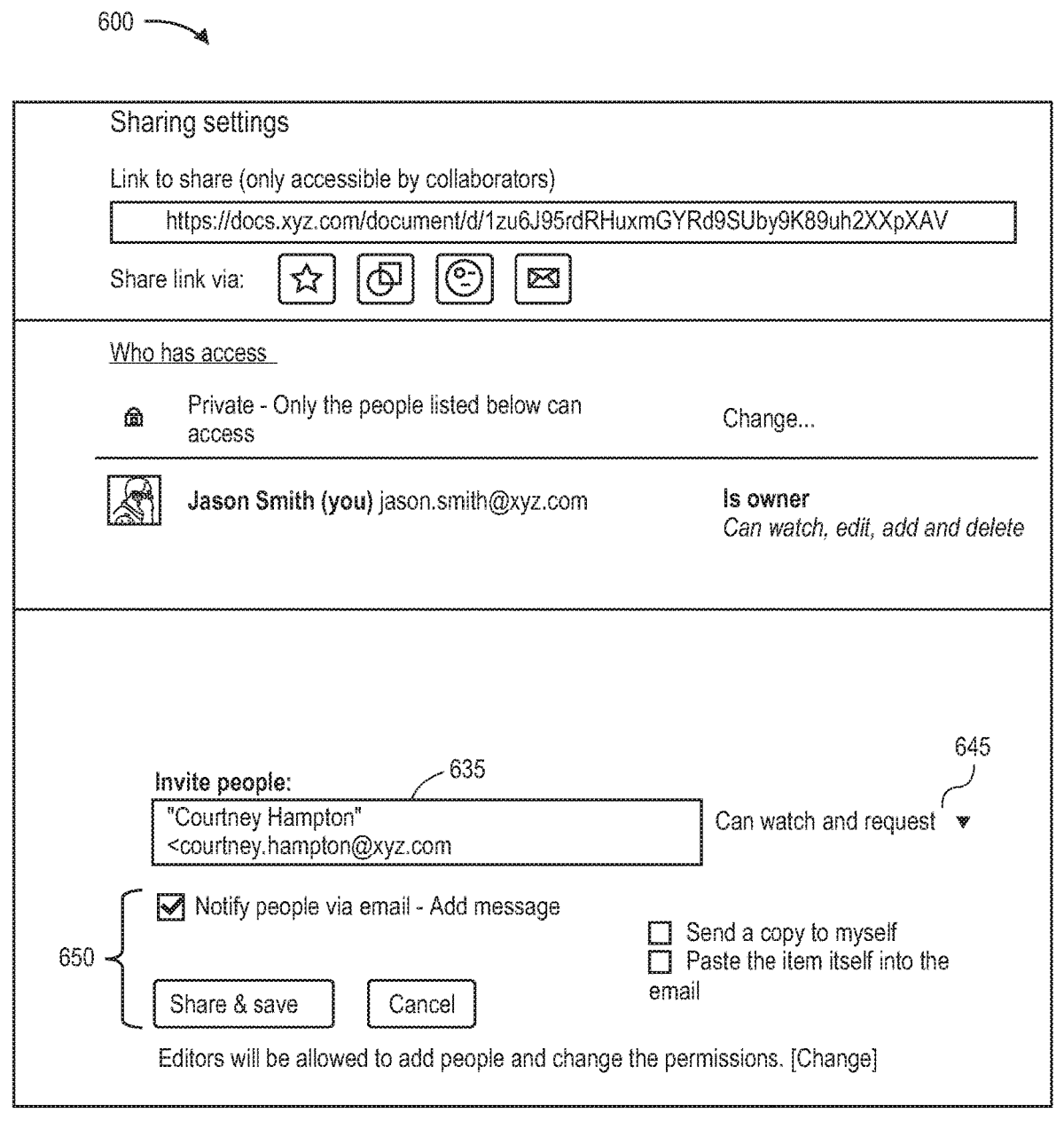
Figure 6D:
Figure 7:
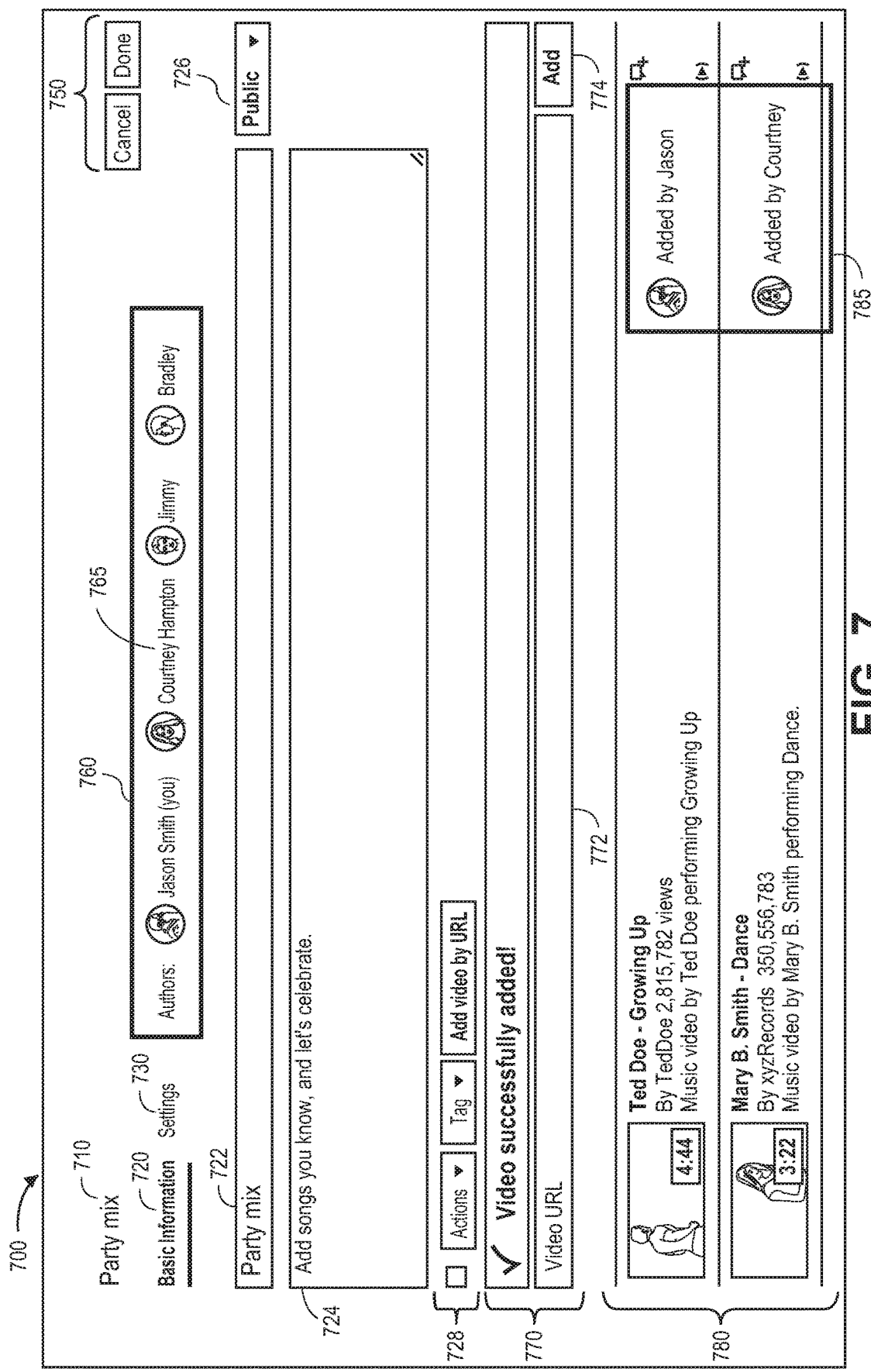
FIG. 7 is an example screenshot illustrating another screenshot of a playlist settings UI provided to a user via a media player at a client device, according to an implementation of the disclosure.

FIGS. 5 through 7 are example screenshots illustrating UIs for sharing comments in time with content item playback. FIG. 5 illustrates an example screenshot of a playlist settings UI 500 provided to a user via a media player at a client device. The playlist settings UI 500 is one example of a UI that may be provided to user of a content sharing platform that is creating a new playlist or editing an already-existing playlist. The playlist settings UI 500 includes a playlist title 510, playlist information tab 520, a playlist settings tab 530, and other control icons 550 ("cancel", "done", etc.).

When the basic information table 520 is selected as the active tab (as illustrated in FIG. 5 when bolded), information elements are presented regarding the basic identifying information of the playlist. For example, as shown in FIG. 5, the basic information elements may include an editable title 522, editable description 524, playlist privacy selector 526, and other playlist action controls 528. The basic information elements 522-528 may be edited by an author of the playlist having the appropriate permissions to edit. For example, the user may change the title or description text associated with the playlist utilizing elements 522, 524. The user may also change the privacy level associated with overall playlist by selecting element 526 to view a drop-down list of privacy options (e.g., public, private, unlisted, etc.) to select from for applying to the playlist.

In addition, a list of authors 560 of the playlist may also be shown as part of the basic information tab 520. As discussed above, implementations of the disclosure allow multiple users of a content sharing platform to be authors of a single playlist. As illustrated, the authors 560 may be shown with an identifying icon, such as an avatar of the user. The avatar of the user may be stored with user data of the user in the content sharing platform, or may be obtained from a social network of the user connected to the content sharing platform. An invite users icon 540 is also provided in playlist settings UI 500 to allow users to invite other users to be authors of the playlist according to implementations of the disclosure. When selected, a sharing settings UI may be presented to the user to invite other users, as discussed below with respect to FIGS. 6A through 6D.

Other locations and configurations of the graphical elements of playlist settings UI 500, other than those illustrated and described above, may also be utilized in implementations of the disclosure.

FIGS. 6A through 6D illustrate example screenshot of a playlist sharing settings UI 600 provided to a user editing a playlist of a content sharing platform via a media player at a client device. With respect to FIG. 6A, the playlist sharing settings UI 600 includes a link sharing section 610, an access section 620, and an invitation section 630. The link sharing section may include a text input box to input a uniform resource locator (URL) of the playlist. This link may be shared with other users by selecting icons associated with different sharing option, such as via email, social networks, blogs, and so on.

The access section 620 may include a privacy setting 622 to apply to the overall playlist. For example, as illustrated in UI 600, the current privacy setting is shown as private, where just those users that are specifically identified are able to view the playlist. The access section 620 also provides a list of users 624 that are either authors and/or viewers of the playlist. A permissions selector 626 is provided for each listed user 624. If a user has the appropriate author permissions, they may adjust the permissions selector 626 for the users 624 of the playlist.

The permissions selector 626 provides permissions options to apply to the user with respect to the user's interactions with the playlist. For example, the permissions may include, but are not limited to, full editing rights (add content, remove content, reorder content, change playlist name, invite authors, invite viewers, etc.), edit playlist content and order, edit playlist order, watch and request, watch/view, and make requests. Permission options may also include content-type restrictions to associate with the user (e.g., types of the content that the user may add to the playlist and/or view from the playlist).

The invitation section 630 allows users to add users to the playlist, either as authors and/or viewers of the playlist. The invitation section 630 includes an add user text box 635 to enter a name, email, alias, or other identifier of a user for purposes of adding the user to the playlist access section 620.

As shown in FIG. 6B, when a user inputs an identifier of a user into the add user text box 635 of playlist sharing settings UI 600, a drop down box 640 may be displayed showing users matching the inputted text. As the inputted text changes, the list of matching users in drop-down box 640 may also change.

Once a user is selected, either from drop-down box 640 or directly inputted into add user text box 635, FIG. 6C depicts a permissions settings 645 selector to apply to the inputted user. As discussed above, various different permission settings may apply to a user, such as, but not limited to, full editing rights (add content, remove content, reorder content, change playlist name, invite authors, invite viewers, etc.), edit playlist content and order, edit playlist order, watch and request, watch/view, and make requests. Permission options may also include content-type restrictions to associate with the user (e.g., types of the content that the user may add to the playlist and/or view from the playlist). These options may be displayed in a drop-down box when the triangle icon corresponding to the permissions selector 645 is selected (e.g., clicked, etc.). Share and save control options 650 are also provided to allow the invited user settings to be saved as playlist metadata and for the invited user to be notified of their addition to the playlist.

Once the information of the invited user has been saved and the invited user notified (and, in some implementations, the invited user accepts the invitation), the playlist sharing settings UI 600 is modified to display the information of the invited user. FIG. 6D is an example screenshot of playlist sharing settings UI 600 after a user has been invited and added to the playlist. Invited user 660 is now shown with corresponding permission settings indicator 665 in the access settings section 620.

Other locations and configurations of the playlist sharing settings UI 600 other than those described with respect to FIGS. 6A through 6D may also be utilized in implementations of the disclosure.

FIG. 7 illustrates another example screenshot of a playlist settings UI 700 provided to a user via a media player at a client device. The playlist settings UI 700 is one example of a UI that may be provided to user of a content sharing platform that is creating a new playlist or editing an already-existing playlist. Similar to playlist setting UI 500 of FIG. 5, the playlist settings UI 700 includes a playlist title 710, playlist information tab 720, a playlist settings tab 730, and other control icons 750 ("cancel", "done", etc.).

When the basic information table 720 is selected as the active tab (as illustrated in FIG. 7 when bolded), information elements are presented regarding the basic identifying information of the playlist. For example, as shown in FIG. 7, the basic information elements may include an editable title 722, editable description 724, playlist privacy selector 726, and other playlist action controls 728. The basic information elements 722-728 may be the same as their identical counterparts described with respect to FIG. 5.

In addition, a list of authors 760 of the playlist may also be shown as part of the basic information tab 720. As discussed above, implementations of the disclosure allow multiple users of a content sharing platform to be authors of a single playlist. As illustrated, the authors 760 may be shown with an identifying icon, such as an avatar of the user. The avatar of the user may be stored with user data of the user in the content sharing platform, or may be obtained from a social network of the user connected to the content sharing platform. Playlist settings UI 700 includes the new author 765 added per the playlist sharing settings UI 600 described with respect to FIGS. 6A through 6D.

Playlist settings UI 700 may also include content item add section 770, which includes a video URL entry box 772 and an add button 774 that allow an author with appropriate content editing privileges to add a content item to the playlist. Once a content item is successfully added (as indicated in content item add section 770), a content item list section 780 of playlist setting UI 700 may be updated to show the added content item. Each content item listed in the content item list section 780 may have a corresponding author attribution 785 to indicate the author (user) that added the content item to the playlist. In some implementations, if one author adds a content item, but it was requested by another user, the author attribution 785 may identify the requesting user as well as the adding user, or may identify just the requesting user.

Other locations and configurations of the graphical elements of playlist settings UI 700, other than those illustrated and described above, may also be utilized in implementations of the disclosure.

Figure 8:
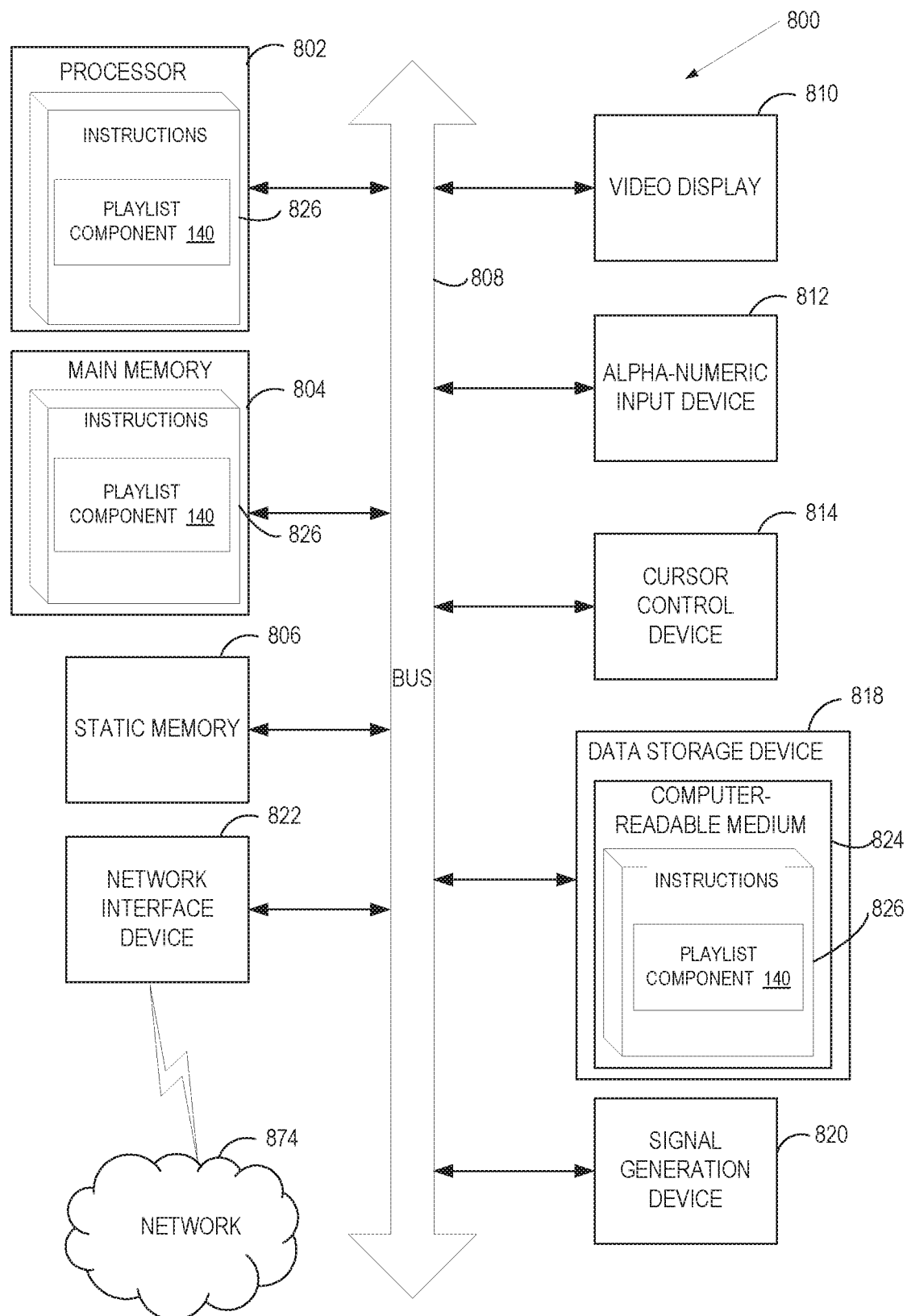
FIG. 8 is a block diagram illustrating an exemplary computer system, according to some implementations.

FIG. 8 illustrates a diagrammatic representation of a machine in the exemplary form of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 808.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein.

The computer system 800 may further include a network interface device 822. The computer system 800 also may include a video display unit 810 (e.g., a liquid crystal display (LCD), a cathode ray tube (CRT), or a touch screen), an alphanumeric input device 812 (e.g., a keyboard), a cursor control device 814 (e.g., a mouse), and a signal generation device 820 (e.g., a speaker).

The data storage device 818 may include a computer-readable storage medium 824 on which is stored one or more sets of instructions 826 (e.g., software) embodying any one or more of the methodologies or functions described herein. The instructions 826 may also reside, completely or at least partially, within the main memory 804 and/or within the processor 802 during execution thereof by the computer system 800, the main memory 804 and the processor 802 also constituting computer-readable storage media. The instructions 826 may further be transmitted or received over a network 874 via the network interface device 822.

In one implementation, the instructions 826 include instructions for a playlist component 140, which may correspond, respectively, to their identically-named counterparts described with respect to FIGS. 1 and 2, and/or a software library containing methods that create a single playlist with multiple authors on a content sharing platform. While the computer-readable storage medium 824 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
storing, by a processing device of a content sharing platform, a uniform resource locator (URL) of a playlist and a first identifier (ID) of a first user that is an author of the playlist as metadata of the playlist, the URL to access the playlist on the content sharing platform;
receiving an invite indication that a second user is to be invited as another author of the playlist;
providing, via a graphical user interface (GUI) of the content sharing platform, sharing options for inviting the second user to be the another author of the playlist, the sharing options comprising at least a social network and email;
receiving a sharing indication of a selected sharing option of the sharing options;
providing, based on the selected sharing option, an invitation for the second user, the invitation to request the second user to be an author of the playlist and to provide access to the playlist via the URL; and
responsive to receiving an acceptance indication of acceptance of the request by the second user, storing a second ID of the second user and permissions corresponding to the second user as the metadata of the playlist.

2. The method of claim 1, wherein the playlist comprises one or more content items of the content sharing platform grouped together for continuous playback.

3. The method of claim 1, wherein the first user is an only author of the playlist with revocation privileges with respect to the playlist.

4. The method of claim 1, wherein the permissions are selected by the first user and define editing rights of the playlist that are assigned to the second user, and wherein the second user is allowed to interact with the playlist in accordance with the permissions corresponding to the second user.

5. The method of claim 1, wherein the sharing indication comprises the second ID of the second user and the permissions corresponding to the second user, wherein the permissions comprise content type permissions pertaining to the second user, the content type permissions to restrict a type of content item of the content sharing platform that the second user can add to the playlist, wherein the type of content item is in accordance with a content rating of the content item.

6. The method of claim 1, wherein the permissions comprise at least one of adding content items to the playlist, deleting content items from the playlist, editing a title of the playlist, editing a description of the playlist, editing an order of the playlist, inviting users to view the playlist, or inviting users as authors of the playlist.

7. The method of claim 1, wherein the second user comprises a plurality of users of the content sharing platform.

8. The method of claim 1, wherein the invitation further comprises the URL of the playlist.

9. An apparatus comprising:
a display device;
a memory communicably coupled to the display device; and
a processing device communicably coupled to the memory, the processing device to execute instructions to:
store a uniform resource locator (URL) of a playlist and a first identifier (ID) of a first user that is an author of the playlist as metadata of the playlist, the URL to access the playlist on a content sharing platform;
receive an invite indication that a second user is to be invited as another author of the playlist;
provide, via a graphical user interface (GUI) of the content sharing platform, sharing options for inviting the second user to be the another author of the playlist, the sharing options comprising at least a social network and email;
receive a sharing indication of a selected sharing option of the sharing options;
provide, based on the selected sharing option, an invitation for the second user, the invitation to request the second user to be an author of the playlist and to provide access to the playlist via the URL; and
responsive to receiving an acceptance indication of acceptance of the request by the second user, store a second ID of the second user and permissions corresponding to the second user as the metadata of the playlist.

10. The apparatus of claim 9, wherein the playlist comprises one or more content items of the content sharing platform grouped together for continuous playback.

11. The apparatus of claim 9, wherein the first user is an only author of the playlist with revocation privileges with respect to the playlist.

12. The apparatus of claim 9, wherein the permissions are selected by the first user and define editing rights of the playlist that are assigned to the second user, and wherein the second user is allowed to interact with the playlist in accordance with the permissions corresponding to the second user.

13. The apparatus of claim 9, wherein the sharing indication comprises the second ID of the second user and the permissions corresponding to the second user, wherein the permissions comprise content type permissions pertaining to the second user, the content type permissions to restrict a type of content item of the content sharing platform that the second user can add to the playlist, wherein the type of content item is in accordance with a content rating of the content item.

14. The apparatus of claim 9, wherein the permissions comprise at least one of adding content items to the playlist, deleting content items from the playlist, editing a title of the playlist, editing a description of the playlist, editing an order of the playlist, inviting users to view the playlist, or inviting users as authors of the playlist.

15. The apparatus of claim 9, wherein the invitation further comprises the URL of the playlist.

16. A non-transitory machine-readable storage medium storing instructions which, when executed, cause a processing device to perform operations comprising:
storing, by the processing device of a content sharing platform, a uniform resource locator (URL) of a playlist and a first identifier (ID) of a first user that is an author of the playlist as metadata of the playlist, the URL to access the playlist on the content sharing platform;
receiving an invite indication that a second user is to be invited as another author of the playlist;
providing, via a graphical user interface (GUI) of the content sharing platform, sharing options for inviting the second user to be the another author of the playlist, the sharing options comprising at least a social network and email;
receiving a sharing indication of a selected sharing option of the sharing options;
providing, based on the selected sharing option, an invitation for the second user, the invitation to request the second user to be an author of the playlist and to provide access to the playlist via the URL; and
responsive to receiving an acceptance indication of acceptance of the request by the second user, storing a second ID of the second user and permissions corresponding to the second user as the metadata of the playlist.

17. The non-transitory machine-readable storage medium of claim 16, wherein the playlist comprises one or more content items of the content sharing platform grouped together for continuous playback.

18. The non-transitory machine-readable storage medium of claim 16, wherein the permissions are selected by the first user and define editing rights of the playlist that are assigned to the second user, and wherein the second user is allowed to interact with the playlist in accordance with the permissions corresponding to the second user.

19. The non-transitory machine-readable storage medium of claim 16, wherein the sharing indication comprises the second ID of the second user and the permissions corresponding to the second user, wherein the permissions comprise content type permissions pertaining to the second user, the content type permissions to restrict a type of content item of the content sharing platform that the second user can add to the playlist, wherein the type of content item is in accordance with a content rating of the content item.

20. The non-transitory machine-readable storage medium of claim 16, wherein the permissions comprise at least one of adding content items to the playlist, deleting content items from the playlist, editing a title of the playlist, editing a description of the playlist, editing an order of the playlist, inviting users to view the playlist, or inviting users as authors of the playlist.

* * * * *